United States Patent [19]

Rosen

[11] Patent Number: 5,712,998
[45] Date of Patent: Jan. 27, 1998

[54] FAST FULLY ASSOCIATIVE TRANSLATION LOOKASIDE BUFFER WITH THE ABILITY TO STORE AND MANAGE INFORMATION PERTAINING TO AT LEAST TWO DIFFERENT PAGE SIZES

[75] Inventor: Eitan E. Rosen, Abrim, Israel

[73] Assignee: Intel Corporation, Santa Clara, Calif.

[21] Appl. No.: 618,331

[22] Filed: Mar. 19, 1996

Related U.S. Application Data

[63] Continuation of Ser. No. 91,218, Jul. 13, 1993, abandoned.

[51] Int. Cl.$^6$ ............................. G06F 12/08; G06F 13/00
[52] U.S. Cl. ..................... 395/415; 364/DIG. 1; 364/238; 364/238.6; 364/256.3; 364/256.4; 364/255.7; 395/410; 395/417
[58] Field of Search ................ 364/DIG. 1, DIG. 2, 364/243.4, 255.7, 238, 238.6, 239, 254, 254.3, 256.3, 256.4; 395/445, 412, 413, 414, 415, 416, 410, 417

[56] References Cited

U.S. PATENT DOCUMENTS

| 4,682,281 | 7/1987 | Woffinden et al. | 395/400 |
|---|---|---|---|
| 4,812,969 | 3/1989 | Takagi et al. | 395/400 |
| 5,058,003 | 10/1991 | White | 364/200 |
| 5,133,058 | 7/1992 | Jensen | 395/400 |
| 5,226,133 | 7/1993 | Taylor et al. | 395/400 |
| 5,263,140 | 11/1993 | Riordan | 395/400 |
| 5,317,711 | 5/1994 | Bourekas et al. | 395/425 |
| 5,327,372 | 7/1994 | Oka et al. | 315/49 |
| 5,353,426 | 10/1994 | Patel et al. | 395/425 |
| 5,375,214 | 12/1994 | Mirza et al. | 395/417 |
| 5,412,787 | 5/1995 | Forsyth et al. | 395/400 |
| 5,442,766 | 8/1995 | Chu et al. | 395/414 |
| 5,463,750 | 10/1995 | Sachs | 395/496 |
| 5,465,337 | 11/1995 | Kong | 395/417 |

OTHER PUBLICATIONS

"High–Speed Compact Circuits with CMOS", I.E.E.C Journal R.H. Krambeck vol. SC–17, No. 3 Jun. 1982. pp. 614–619.

Primary Examiner—Tod R. Swann
Assistant Examiner—Tuan V. Thai
Attorney, Agent, or Firm—Blakely, Sokoloff, Taylor & Zafman

[57] ABSTRACT

A fast, fully associative translation lookaside buffer (TLB) with the ability to store and manage information pertaining to at least two different page sizes is described. The TLB utilizes a tag array with tag lines and a data array with corresponding data lines. Within the tag array, each tag line incorporates a control cell which selectively enables or disables comparisons of tag bits to corresponding bits from an input address to the TLB. Within the data array, each data line incorporates control cells and multiplexing data cells to selectively determine whether bits in the physical address output of the TLB will be the derived from the contents of the multiplexing data cells or bits from the input address. The use of control cells in the tag array and control cells and multiplexing data cells in the data array thereby provides for the ability to store and manage information pertaining to at least two different page sizes in a single TLB.

33 Claims, 11 Drawing Sheets

1

FAST FULLY ASSOCIATIVE TRANSLATION LOOKASIDE BUFFER WITH THE ABILITY TO STORE AND MANAGE INFORMATION PERTAINING TO AT LEAST TWO DIFFERENT PAGE SIZES

This is a continuation of application Ser. No. 08/091,218, filed Jul. 13, 1993, now abandoned.

BACKGROUND OF THE INVENTION

1. Field of the Invention

The present invention relates to microprocessor systems, and more particularly, to translation lookaside buffers for use in conjunction with high performance microprocessors.

2. Art Background

In order to avoid frequent, cycle consuming accesses of main memory, a microprocessor system frequently utilizes cache memory. Cache memory is typically comprised of a relatively small amount of static random access memory (SRAM) which is both physically faster than main memory and arranged such that it can be addressed more rapidly than main memory. The microprocessor within the system then uses the faster cache memory to capture and store processor information as it is used. The processor information is stored within the cache memory in accordance with a predetermined mapping policy. Examples of such mapping policies include, direct mapping, set associative mapping, and fully associative mapping. The storage of processor information in a cache memory allows the processor to quickly and advantageously obtain this information from the cache memory rather than from main memory. The intelligent design and use of a cache memory can substantially enhance the performance of the overall microprocessor system.

Modern microprocessor systems also typically utilize virtual addressing. Virtual addressing enables the system to effectively create a virtual memory space larger than the actual physical memory space. A processor can then advantageously operate in virtual address space using virtual addresses. Frequently, however, these virtual addresses must be translated into physical addresses. One way of accomplishing this translation of virtual addresses into physical addresses is to regularly access translation tables stored in main memory. However, regularly accessing translation tables in main memory tends to slow overall system performance. Accordingly, in order to avoid the need to regularly access translation tables in main memory to accomplish address translation, modern microprocessor systems often use a translation lookaside buffer (TLB) to store or cache recently generated virtual to physical address translations.

A translation lookaside buffer (TLB) can be thought of as a special type of cache memory. As with other types of caches, a TLB is typically comprised of a relatively small amount of memory specially designed to be quickly accessible. A TLB typically incorporates both a tag array and a data array. Within the tag array, each tag line stores a virtual address. This tag line is then associated with a corresponding data line in the data array which stores the physical address translation for the virtual address. Thus, prior to seeking a translation of a virtual address from translation tables in main memory, a processor can first refer to the TLB to determine whether the physical address translation of the virtual address is presently stored in the TLB. In the event that the virtual address and corresponding physical address are presently stored in the TLB, the TLB responsively outputs the corresponding physical address, and a time-consuming access of main memory is avoided.

A number of issues must be addressed in the design and operation of a TLB. One such issue is the mapping policy of the TLB. As noted above, a cache can be mapped in accordance with one of any number of mapping policies, including direct mapping, set associative mapping, and fully associative mapping. A TLB mapped in accordance with a fully associative mapping policy provides the advantage of operating at a greater speed than a similarly designed TLB mapped in accordance with a set associative mapping policy. However, a fully associative TLB will tend to require a greater amount of chip space to implement.

A second issue which arises is the issue of different page lengths. Under certain circumstances, it is desirable to use large pages sizes, while under other circumstances, it is desirable to use small page sizes. Page sizes, it will be appreciated, correspond to the organization of information in main memory. In a virtual memory system, when a processor wishes to access a particular location in main memory, it specifies both a virtual address for the page in main memory (which must be translated into a physical address for the page) and the address within that page. The desire to provide for the translation of virtual addresses corresponding to both a first page size and a second page size has typically led to designs which utilize two TLB's. A first TLB is used to store virtual address/physical address pairs for a first page size, while a second TLB is used to store virtual address/physical address pairs for a second page size.

As will be described, the present invention provides for a single, fully associative TLB capable of storing and managing virtual address/physical address pairs of varied page sizes. In particular, the TLB of the present invention incorporates control cells in the tag array, and control cells in conjunction with multiplexing data cells in the data array to directly manage tag lines and data lines of varied page sizes without slowing the speed path of the TLB.

SUMMARY OF THE INVENTION

The present invention finds application in the area of microprocessor systems, and more particularly, to a fast, fully associative translation lookaside buffer (TLB) for a high performance microprocessor. The TLB incorporates both a tag array and a data array. In operation, an input address to the TLB is first compared to the virtual address tags stored in the tag array. If the input address matches one of the virtual address tags, a TLB hit occurs, and the physical address corresponding to this virtual address tag is output from the TLB.

In accordance with the present invention, the TLB has the ability to store and manage information pertaining to at least two different page sizes. Within the tag array, each tag line incorporates a control cell which selectively enables or disables comparisons of tag bits to corresponding bits from an input address to the TLB. The present invention further incorporates control cells and multiplexing data cells in the data array. The control cells operate in conjunction with multiplexing data cells to selectively determine whether certain bits in the physical address output of the TLB will be derived from the contents of the multiplexing data cells or corresponding bits from the input address. Time is never taken by the system to "read" a control cell in a data line to perform this multiplexing function. Instead, the control cell automatically and directly determines whether or not the bits stored in the multiplexing data cells or corresponding bits from the input address will be used. In order to perform this multiplexing function, the present invention utilizes a domino logic structure in the data array.

Thus, through the use of control cells, multiplexing data cells, and a domino logic structure, the present invention provides for a single, fully associative TLB which is able to store and manage tag and data lines corresponding to addresses of varied page sizes. The TLB additionally provides for this enhanced capability without compromising the speed of the TLB.

BRIEF DESCRIPTION OF THE DRAWINGS

Further details are explained below with the help of the examples illustrated in the attached drawings in which.

DETAILED DESCRIPTION OF THE INVENTION

A fast, fully associative translation lookaside buffer for a high performance microprocessor is described. In the following description, for purposes of explanation, numerous specific details including line sizes and bit values are set forth in order to provide a satisfactory understanding of the present invention. However, it will be apparent to one skilled in the art that such specific details are not essential to the practice of the present invention. Additionally, it will be appreciated that while the description which follows will refer to a particular processor architecture and particular translation lookaside buffer (TLB), the present invention is in no way limited to this particular processor or TLB. In a number of figures, well known electrical structures and circuits are shown in block diagram form in order not to obscure the present invention unnecessarily.

Figure 1:
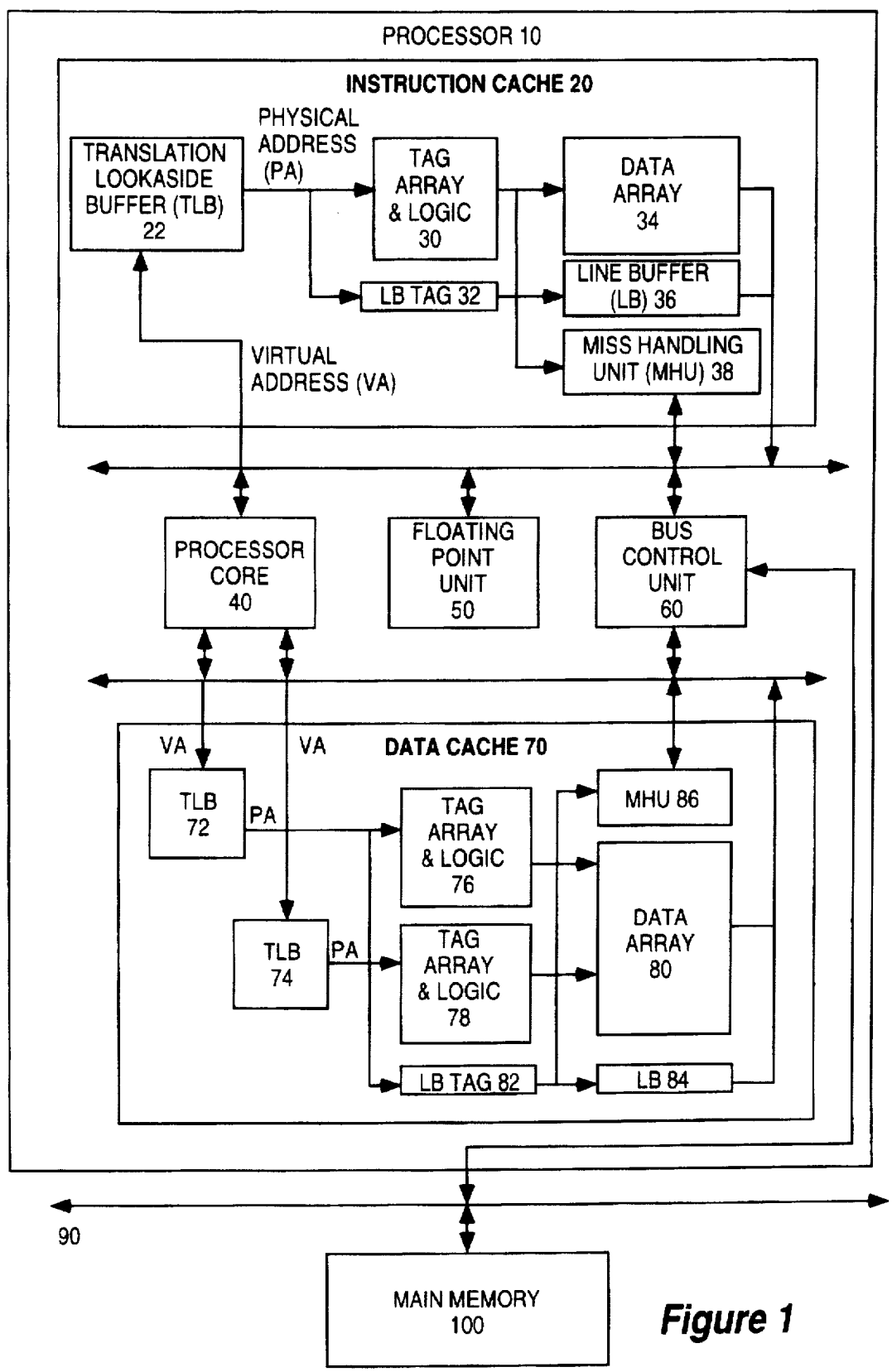
FIG. 1 illustrates a microprocessor system in which the present invention can be utilized.

Referring now to FIG. 1, this figure illustrates, in block diagram form, one processor in which the present invention can be utilized. As shown, the system includes a processor 10 disposed, for example, upon a single chip, coupled to a system bus 90. Main memory 100, comprised of, for example, DRAM is also coupled to the system bus 90. As shown, processor 10 includes an instruction cache 20, a processor core 40, a floating point unit 50, a bus control unit 60, and a data cache 70.

Instruction cache 20 stores recently used processor instructions, thereby providing for quick and advantageous access of these instructions. As illustrated, instruction cache 20 includes a translation lookaside buffer (TLB) 22, tag array 30, line buffer (LB) tag 32, data array 34, line buffer (LB) 36, and miss handling unit (MHU) 38. Translation lookaside buffer (TLB) 22 is coupled to tag array and logic 30 and line buffer (LB) tag 32, which are in turn, coupled to data array 34 and line buffer (LB) 36, respectively. Miss handling unit (MHU) 38 is further coupled to both tag array and logic 30 and line buffer (LB) tag 32.

Instruction cache 20 provides for the caching of an instruction within a cache line in data array 34, while the address corresponding to this instruction is stored in physical address form, in a corresponding tag line in the tag array 30. Alternatively, a single instruction can be cached in line buffer (LB) 36 with its corresponding physical address tag stored in line buffer (LB) tag 32. Miss handling unit (MHU) 38 records and manages cache misses, and in conjunction with bus control unit 60, selectively controls the process of obtaining an instruction from main memory 100 in the event of an instruction cache miss.

In operation, instruction cache 20 initially receives an instruction request from processor core 40 in the form of a virtual address (VA). Because the tags in the instruction cache 20 are stored in physical address form, the virtual address (VA) must first be translated into a physical address (PA). Accordingly, the virtual address (VA) is initially coupled to translation lookaside buffer (TLB) 22. If a physical address (PA) corresponding to this virtual address (VA) is presently stored in TLB 22, a TLB hit results, and the TLB 22 outputs the physical address (PA) to tag array 30 and the line buffer tag 32.

This physical address is then compared to the physical address tags in tag array 30 and line buffer tag 32. Assuming that the physical address provided by TLB 22 matches a physical address tag stored in tag array and logic 30 or line buffer tag 32, a cache hit results, and the data array 34 or line buffer 36 couples the instruction corresponding to this matching physical address tag to the processor core 40 and floating point unit 50.

The data cache 70 is similar in construction and operation to the instruction cache 20. As shown, however, data cache 70 utilizes two TLB's, TLB 72 and TLB 74 (both single ported). TLB 72 and TLB 74 are coupled, respectively, to tag array 76 and tag array 78, which are in turn, both coupled to data array 80 and miss handling unit (MHU) 86. TLB 72 and TLB 74 are additionally coupled to a line buffer (LB) tag 82 which is coupled to line buffer 84 and miss handling unit (MHU) 86. It will be appreciated from the foregoing description, that tag array 30, LB tag 32, tag array 76, tag array 78, and LB tag 82, store tags in physical address form, thereby necessitating the translation of virtual addresses from the processor core into physical addresses before cache hit or miss determinations can be made. Such translations are advantageously performed by the TLB's incorporated in the processor 10, including TLB 22, TLB 72, or TLB 74.

Figure 2:
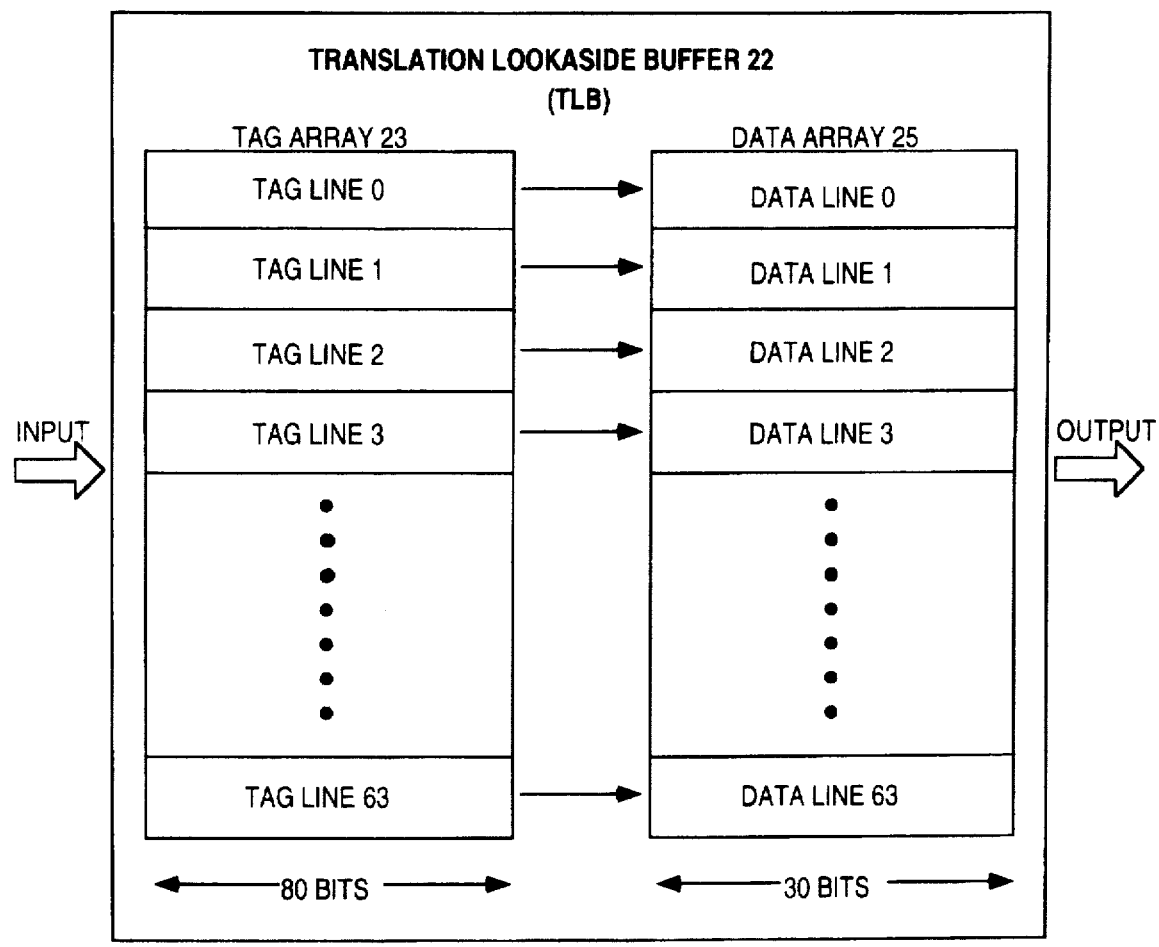
FIG. 2 illustrates a translation lookaside buffer in which the present invention can be utilized.

With reference now to FIG. 2, this figure illustrates the basic organization of a translation lookaside buffer such as TLB 22. As shown, TLB 22 includes a tag array 23 and a data array 25. Tag array 23 provides for the storage of virtual address tags, while data array 25 provides for the storage of corresponding physical addresses. In the embodiment shown, both tag array 23 and data array 25 comprise 64 lines or entries. Each tag line in tag array 23 stores 80 bits, while each data line in data array stores 30 bits. In operation, a virtual address input (hereinafter referred to as the input address) is initially coupled to the TLB input. The input address is then compared to the virtual address tags stored in tag array 23. If the input address matches one of the virtual address tags, a TLB hit occurs, and the physical address corresponding to this virtual address tag is output from the TLB.

TLB 22 can be mapped in accordance with any one of a number of possible mapping policies. These might include, for example, direct mapping, set associative mapping, or fully associative mapping. To maximize the speed of operation, TLB 22 is advantageously mapped in accordance with a fully associative mapping policy. In operation, then, an input address is simultaneously compared to the virtual address tags in each and every tag line in tag array 23. Implementing such a capability, it will be appreciated, requires the use of N comparators, where N is equal to the number of tag lines, in this embodiment, 64. It will be appreciated that implementing a fully associative TLB, as opposed to a TLB mapped in accordance with one of the other mapping policies, will tend to require greater chip space.

Figure 3A:
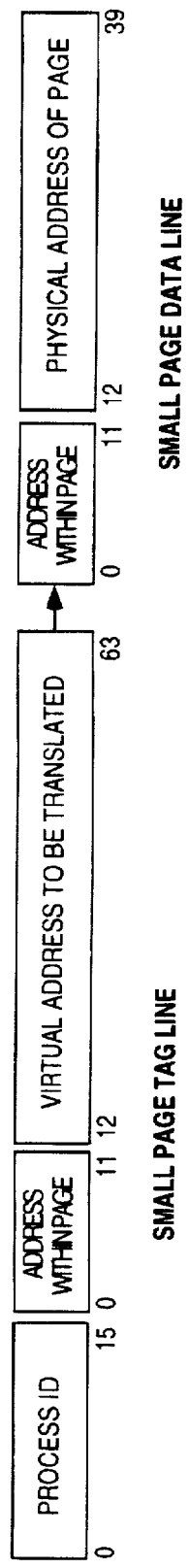
FIGS. 3a and 3b illustrate how a small page entry and a large page entry would differ if stored in the translation lookaside buffer.
Figure 3B:
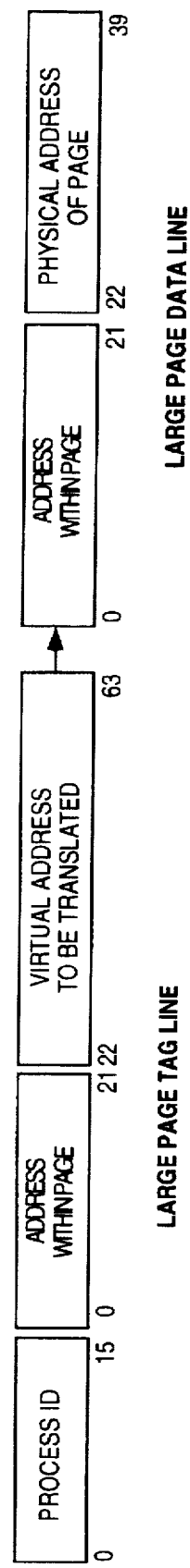

Referring now to FIGS. 3a and 3b, these figures illustrate how a small page entry and a large page entry would differ if stored in the translation lookaside buffer 22. In particular, FIG. 3a illustrates a sample breakdown of bits in a tag line and corresponding data line in the case of a relatively small page size, for example, 4K words. FIG. 3b illustrates a breakdown of bits in a tag and data line in the case of a relatively large page size, for example, 4 MB. These page sizes correspond to the organization of information in main memory. In a virtual memory system, when a processor wishes to access a particular location in main memory, it specifies both a virtual address for the page in main memory, which must be translated into a physical address for the page, and the address within that page which does not need to be translated.

Referring now to FIG. 3a, while deferring discussion of the first 16 process ID bits shown, a first set of address bits in the tag line are reserved for the address within the page, while a second set of bits are reserved for the virtual address to be translated. In the small page size of 4K words, 12 bits are sufficient to describe the address within each page. Accordingly, as shown, bits 0-11 are reserved for a designation of the address within each page. The remaining bits, bits 12-63, comprise the virtual address to be translated which will be compared to corresponding bits from the input address to determine whether a TLB hit has occurred. The data line which corresponds to this tag line, comprises a similar number of bits for the address within the page, bits 0-11, and a set of bits 12-39 which define the physical address of the page.

Referring now to FIG. 3b, in the case of a large page, a greater number of bits are needed to define the physical address within the page, while a lesser number of bits are used to define the virtual address to be compared to and translated. In a large page size of 4 MB, 22 bits are needed to describe the address within each page. Accordingly, as shown, bits 0-21 of the tag line are reserved for a designation of the address within each page. The remaining bits of the tag line, bits 22-63, comprise the virtual address of the page to be translated which will be compared to corresponding bits from the input address to determine whether a TLB hit has occurred. The data line which corresponds to this tag line, comprises a similar number of bits for the address within the page, bits 0-21, and a set of bits 22-39 which define the physical address of the page.

Thus, it will be appreciated from FIGS. 3a and 3b, that page size dictates a particular breakdown of the bits in the tag and data lines of a TLB. The embodiment shown in these figures additionally appends to each tag line a number of bits reserved for process ID information (bits 0-15). This information is used to designate the process which owns the particular TLB entry such that, for example, a first process is prevented from using the TLB entries belonging to a second process. In this way, protection is provided for without the need to flush the TLB whenever processes are changed.

The desire to provide for the translation of virtual addresses corresponding to both a first page size and a second page size has typically led to designs which utilize two TLB's. A first TLB is used to store tag line/data line pairs for a first page size, and a second TLB is used to store tag line/data line pairs for a second page size. Thus, for example, referring to FIG. 3a and 3b, under this approach, a first TLB would store information in accordance with the format shown in FIG. 3a, while a second TLB would stored information in accordance with the format shown in FIG. 3b. In contrast to this prior art design approach, however, as will be described, the present invention provides for a method and apparatus wherein a single, fully associative TLB stores and utilizes tag and data lines corresponding to addresses of varied page sizes.

Figure 4:
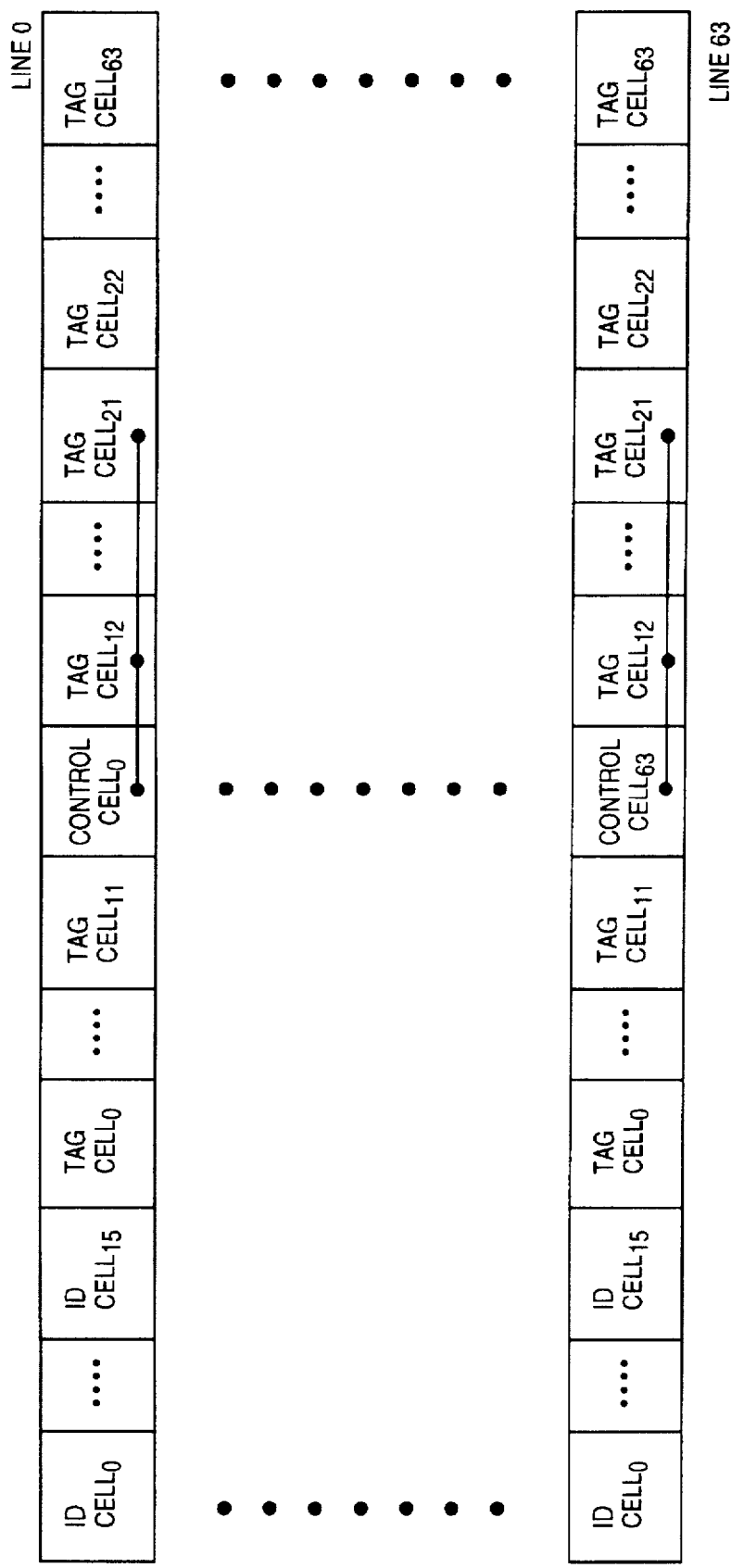
FIG. 4 illustrates the use of control cells in the tag array of the translation lookaside buffer in accordance with the present invention.

Referring now to FIG. 4, this figure illustrates in a functional block diagram, the incorporation of control cells in a tag array in accordance with the present invention. As shown, each of the tag lines, tag line 0-tag line 63, incorporates a plurality of tag cells. In particular, each tag line includes: ID $Cell_0$-ID $Cell_{15}$ which are content addressable memory cells (CAM's) used to store process ID information; and tag $cell_0$-tag $cell_{11}$, tag $cell_{12}$-tag $cell_{21}$, and tag $cell_{22}$-tag $cell_{63}$, which are also content addressable memory cells (CAM's) used to store virtual address tag information. As shown, in accordance with the present invention, each tag line further incorporates a control cell which is not simply another CAM, but is instead, a memory cell used to selectively enable and disable comparisons of neighboring tag cells to corresponding input address bits. For example, with reference to control $cell_0$, this control cell selectively determines whether the contents of the tag cells, tag $cell_{12}$-tag $cell_{21}$, will be compared to corresponding bits from the input address. In accordance with the present invention, each tag line incorporates a separate, similarly disposed control cell, up to and including control $cell_{63}$ in tag $line_{63}$.

In operation, when tag $line_0$ stores address bits corresponding to a large page size, the control $cell_0$ stores a first value such that it directly disables any comparison of the bits stored in tag $cell_{12}$-tag $cell_{21}$ to corresponding bits from the input address. Thus, only the bits stored in tag $cell_{22}$-tag $cell_{63}$ are compared to corresponding bits from the input address. Alternatively, when tag $line_0$ stores address bits corresponding to a small page, control $cell_0$ stores a second value such that it directly enables a comparison of the bits stored in tag $cell_{12}$-tag $cell_{21}$ to corresponding bits from the input address. Thus, the larger number of bits stored in tag $cell_{12}$-tag $cell_{63}$ are compared to corresponding bits from the input address. It will be appreciated that in neither case, are the bits stored in tag $cell_0$-tag $cell_{11}$ compared to corresponding bits from the input address. These bits are necessarily dedicated to the address within the page in both the case of the small page and the large page.

Figure 5:
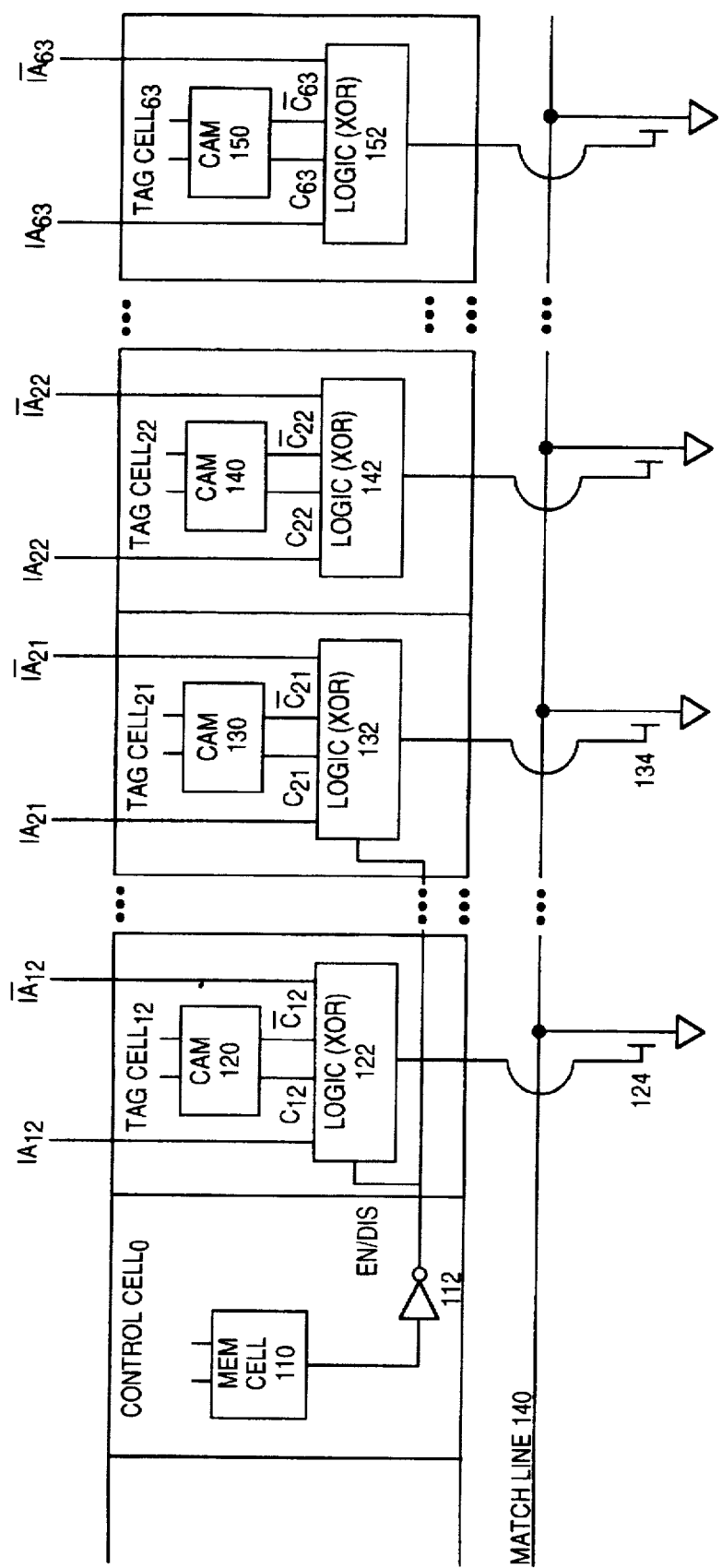
FIG. 5 illustrates the use of control cells in the tag array in greater detail.

FIG. 5 illustrates in greater detail, the functioning of the control cell within a tag line. In this figure, each one of the tag cells, tag cell$_{12}$–tag cell$_{21}$ is similarly constructed, while each one of the tag cells, tag cell$_{22}$–tag cell$_{63}$ is similarly constructed. It can be observed that the control cell$_0$ provides an enable/disable signal (En/Dis) to only certain of the tag cells, tag cell$_{12}$–tag cell$_{21}$.

Focusing now on tag cell$_{12}$ for illustrative purposes, this tag cell incorporates contents addressable memory cell (CAM) 120 and logic block 122. CAM 120 holds the bit stored in tag cell$_{12}$in, for example, a 6 device RAM cell. Logic block 120 performs a logical exclusive OR operation (XOR) on the contents of CAM 120, C$_{12}$, and the corresponding bit from the input address (IA$_{12}$). While the output of logic block 122 is an exclusive OR operation (XOR) with respect to C$_{12}$ and IA$_{12}$, as illustrated, logic block 122 can advantageously perform this function faster by using four inputs, including $\overline{C_{12}}$ and $\overline{IA_{12}}$.

In a similar fashion, tag cell$_{22}$ incorporates CAM 140 and logic block 142, such that logic block 142 performs a logical exclusive OR operation (XOR) on the contents of CAM 140, C$_{22}$, and the corresponding bit from the input address (IA$_{22}$). The basic comparator functioning of tag cell$_{22}$–tag cell$_{63}$ is thus identical to the basic comparator functioning of tag cell$_{12}$–tag cell$_{21}$. However, as will be described, through the use of control cell$_0$, the comparator functioning of tag cell$_{12}$–tag cell$_{21}$ can be selectively disabled. The enabled basic comparator functioning of tag cell$_{12}$tag cell$_{21}$ will now be described.

When C$_{12}$ and IA$_{12}$ match, either both high or both low, the output of logic block 122 is asserted low. Alternatively, when C$_{12}$ and IA$_{12}$ do not match, the output of logic block 122 is asserted high. When the output of logic block 122 is asserted high, this causes transistor 124 to discharge, thereby discharging the match line 140 which is advantageously pre-charged before each comparison cycle. Thus, only if the match line remains high after a comparison is made is there a match. The discharge of the match line 140 thus directly indicates the absence of a match, i.e. a TLB miss.

As shown, a control cell$_0$ is disposed in the tag line. The control cell$_0$ incorporates a memory cell 110, for example, a six device RAM cell. The memory cell 110 couples its contents to inverter 112, which in turn, couples its output to each one of the logic blocks in tag cell$_{12}$–tag cell$_{21}$. The output of memory cell 110 is then advantageously used as an enable/disable each of the logic blocks in tag cell$_{12}$tag cell$_{21}$.

The use of a control cell in each tag line provides for the possibility of using a single TLB to store both large and small pages within the same tag array. In particular, in the event a tag line stores a large page tag, a first value is also stored in the control cell for that tag line such that the comparison of IA$_{12}$–IA$_{21}$ to C$_{12}$–C$_{21}$ is disabled. The comparison of these bits essentially becomes a "don't care," and only the comparison of IA$_{22}$–IA$_{63}$ to C$_{22}$–C$_{63}$ is allowed to determine the status of the match line. Alternatively, if a small page tag is stored in the tag line, a second value can be stored in the control cell for that tag line such that the comparison of IA$_{12}$–IA$_{21}$ to C$_{12}$–C$_{21}$ is enabled and proceeds normally. The comparison of these bits, as well as the comparison of bits IA$_{22}$–IA$_{63}$ to C$_{22}$–C$_{63}$ then determines the status of the match line.

It will be appreciated from the foregoing discussion that the control cell of the present invention is not "read" by the system prior to a comparison of a virtual address input to a tag line. Rather, the control cell automatically and directly determines whether or not certain comparisons will be made and allowed to determine the status of the match line for that tag line.

It will further be appreciated that the preceding description discusses the use of a single control cell disposed in each tag line such that two different page sizes can be stored and managed in the TLB. In principle, additional control cells can be disposed in each tag line. For example, in an alternative embodiment, each tag line incorporates two control cells, thereby providing for the ability to store and manage three different page sizes. Alternatively, each tag line can incorporate three control cells, thereby providing for the ability to store and distinguish between four different page sizes. Thus, in principle, each tag lines can incorporate any number of control cells to allow for any number of different page sizes.

Assuming now that an input address matches a tag line in the TLB 22, the issue then arises as to which bits from the corresponding data line in the data array 25 should be used to define the physical address output. In particular, returning briefly to FIG. 3a, it can be observed that if the page size is small, the first 12 bits, bits 0–11, of the physical address output should be comprised of bits 0–11 from the input address itself. These bits, then, should simply be passed from the TLB input to the TLB output. In contrast, bits 12–39 should be taken from the data line in data array 25 corresponding to the tag line found to match. These bits define the physical address of the page, while the first 12 bits define the address within that page.

Alternatively, referring to FIG. 3b, if the page size is large, the first 22 bits, bits 0–21, of the desired physical address output should be comprised of bits 0–21 from the input address. Under such circumstances, bits 0–21 from the input address should simply be passed from the TLB input to the TLB output. On the other hand, bits 22–39 will be taken from the data line in the data array 25 corresponding to the matching tag line. These bits define the physical address of the page, while the first 22 bits define the address within the page.

From the above description, it will be appreciated that determining the source of bits 12–21 for the physical address output from the TLB 22 becomes the principle concern. When the page size is small, these bits should come from bits 12–21 of the input address. When the page size is large, these bits should come from bits 12–21 stored in the corresponding data line in data array 25. As will be described, in accordance with the present invention, to resolve this issue, control cells and multiplexing data cells are incorporated in the data array 25. In the embodiment which will be discussed, the control cells operate in conjunction with multiplexing data cells to selectively determine whether bits 12–21 of the physical address output of the TLB 20 are comprised of bits 12 –21 from the input address, or bits 12 –21 stored in the multiplexing data cells.

Figure 6:
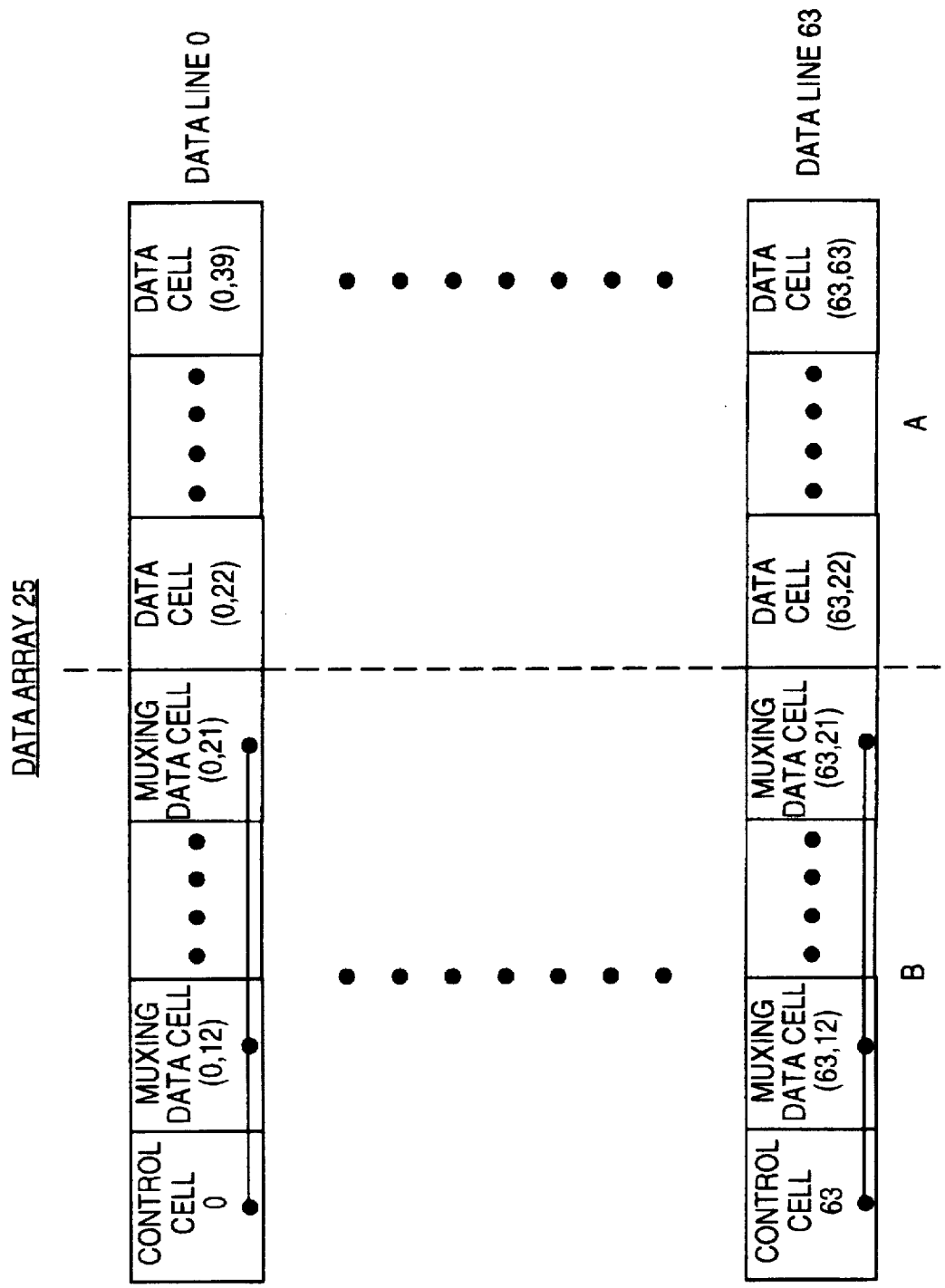
FIG. 6 illustrates the use of control cells in conjunction with multiplexing data cells in the data array in accordance with the present invention.

With reference now to FIG. 6, this figure illustrates in a simplified block diagram, the incorporation of control cells and multiplexing data cells in the data array 25 of TLB 20. The data lines between data line 0 and data line 63 are similarly constructed. Referring for illustrative purposes to data line 0, this data line comprises: a control cell 0; multiplexing data cell (0,12)–multiplexing data cell (0,21); and data cell (0,22)–data cell (0,39).

As will be described, in operation, when data line 0 stores a physical address corresponding to a large page size, the control cell 0 couples a first signal to multiplexing data cell (0,12)–multiplexing data cell (0,21), which causes these cells to output bits 12–21 from the input address. Alternatively, when data line 0 stores a physical address corresponding to a small page size, the control cell 0 couples a second signal which causes these cells to output the contents stored in multiplexing data cell (0,12)–multiplexing data cell (0,21).

In accordance with the present invention, time is never taken by the system to "read" a control cell in a data line to perform this determination. Instead, the control cell automatically and directly determines whether or not the information stored in the multiplexing data cells, or the input address bits, will be used to make up the physical address output. Additionally, as was discussed with respect to the use of control cells in the tag array, in principle, additional control cells can be disposed in each data line with accompanying multiplexing memory cells to allow for the ability to multiplex between any number of different page sizes.

Figure 7:
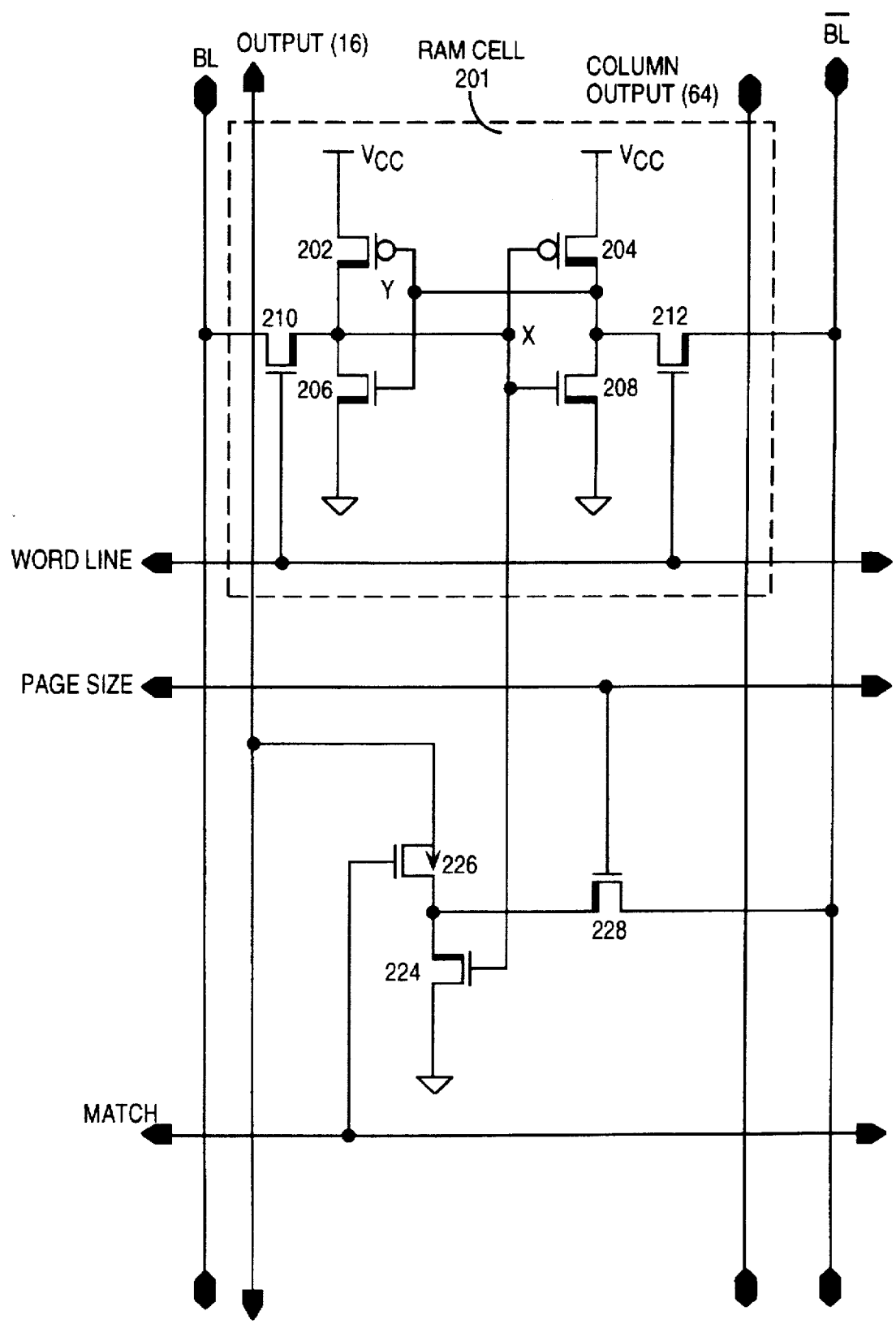
FIG. 7 illustrates the circuit configuration of a multiplexing data cell with the capability of responding to the assertion of a page size signal from a control cell.

Referring now to FIG. 7, this figure illustrates the multiplexing data cell (MDC) of the present invention. As will be described, the illustrated MDC circuit is designed for use in conjunction with a domino logic structure. As shown in FIG. 7, the multiplexing data cell incorporates a RAM cell 201 comprising six transistors 202, 204, 206, 208, 210 and 212. It will be appreciated that transistors 202, 204, 206, and 208 are coupled such that they form back-to-back inverters, while transistors 210 and 212 serve as pass gates for the RAM cell 201. It will further be appreciated that the RAM cell 201 stores data at node X and the complement of this data at node Y. In order to write a bit into the RAM cell 201, the Word Line is asserted while the bit is coupled to the Bit Line Bar ($\overline{BL}$) and the complement of the bit is coupled to the Bit Line Bar ($\overline{BL}$). As a result, the pass gate transistors 210 and 212 are enabled and the bit is written into node X and the complement of this information at node Y.

In accordance with the present invention, the node storing the contents of the RAM cell is coupled to the gate of a first transistor 224. The source of transistor 224 is coupled to ground, while the drain of transistor 224 is coupled to the source of a second transistor 226. The gate of transistor 226 is coupled to the previously described Match Line from the tag array, while the drain of transistor 226 provides the output for the multiplexing memory cell to Output (16) Line. A third transistor 228 has its source coupled to the drain of transistor 224 and the source of transistor 226. The drain of transistor 228 is coupled to the Bit Line Bar ($\overline{BL}$). The gate of the controlling transistor 228 is coupled to a Page Size Line which provides a page size signal from a control cell associated with the multiplexing memory cell.

Figure 8:
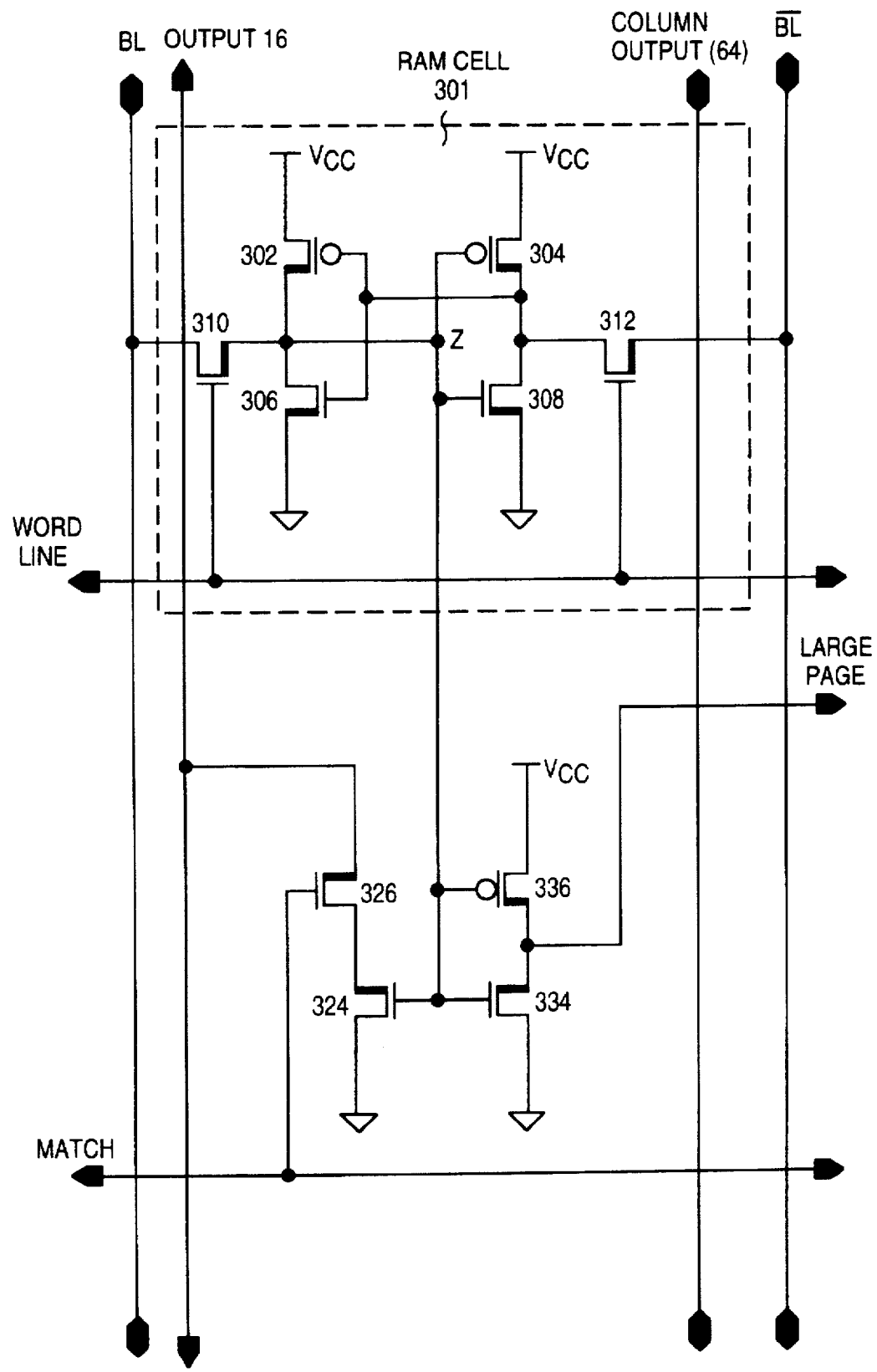
FIG. 8 illustrates the circuit configuration of a control cell to be used incorporated in a data line in the data array.

Referring now to FIG. 8, this figure illustrates the structure of a control cell used in conjunction with the above described multiplexing memory cell. As shown, the control cell incorporates a RAM cell 301 comprising six transistors 302, 304, 306, 308, 310 and 312. Transistors 302, 304, 306, and 308 are coupled such that they form back-to-back inverters, while transistors 310 and 312 serve as pass gates. RAM cell 301 stores control cell information at node Z.

As shown, control cell information at node Z is coupled to an inverter circuit comprising transistors 336 and 334. This inverter circuit drives the control circuit information held at node Z over the Page Size line. Transistors 324 and 326 are not necessary for the functioning of the control cell but can be advantageously incorporated as shown to allow for the selective coupling of control cell information to output (16). In this way control cell information can be read for testing purposes on the output line.

Figure 9:
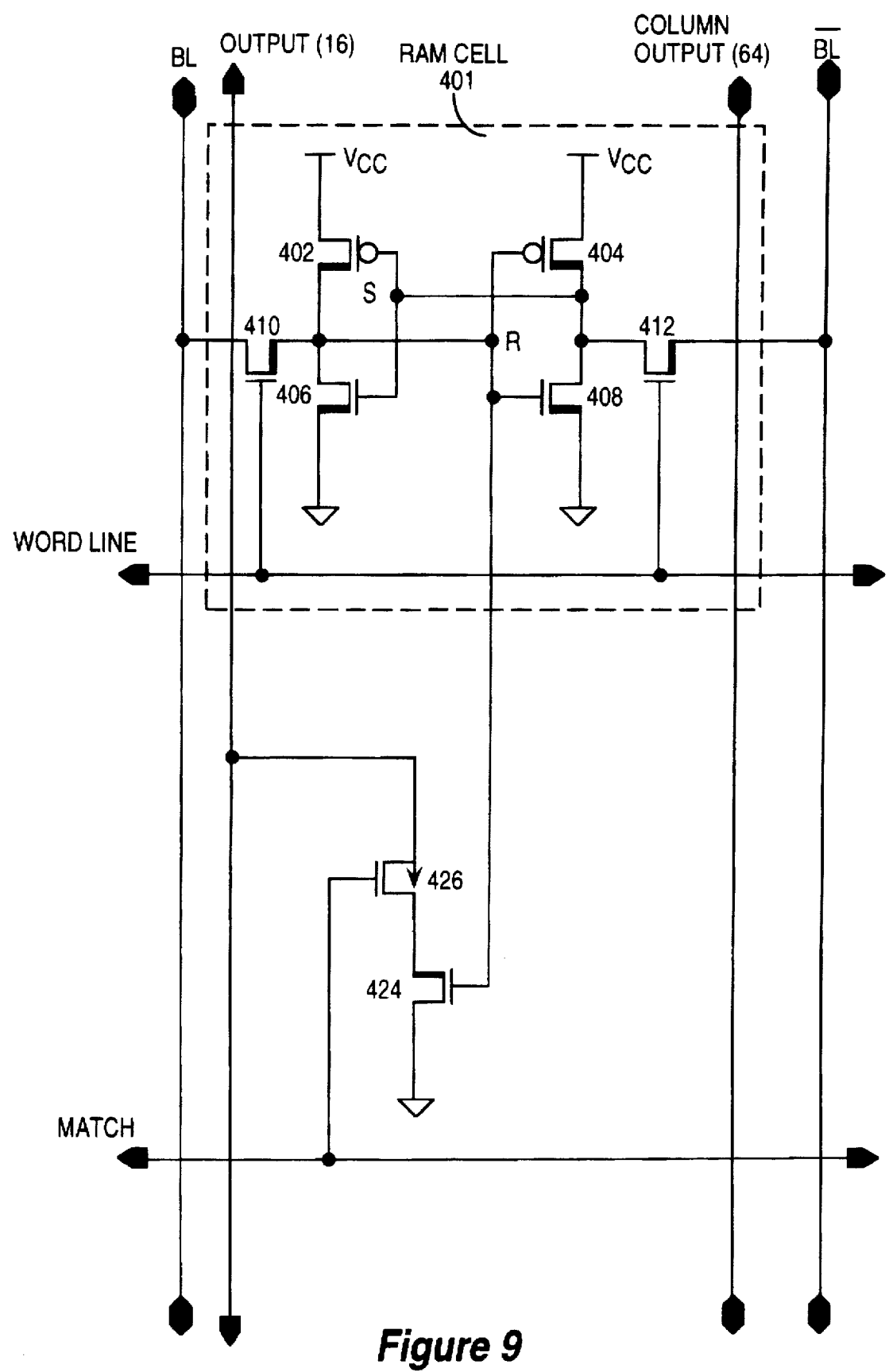
FIG. 9 illustrates the circuit configuration of a data cell in the data array.

With reference to FIG. 9, this figure illustrates the structure of a non-multiplexing data cell. As shown the data cell incorporates a RAM cell 401 comprising six transistors 402, 404, 406, 408, 410 and 412. Transistors 402, 404, 406, and 408 are coupled such that they form back-to-back inverters, while transistors 410 and 412 serve as pass gates for the RAM cell 401. The RAM cell 401 stores data at node R and the complement of this data at node S. Node R is coupled to the gate of transistor 424. The source of transistor 424 is coupled to ground, while the drain of transistor 424 is coupled to the source of transistor 426. The gate of transistor 426 is coupled to the previously described match line, while the drain of transistor 426 provides the output for the data cell to Output (16).

Figure 10:
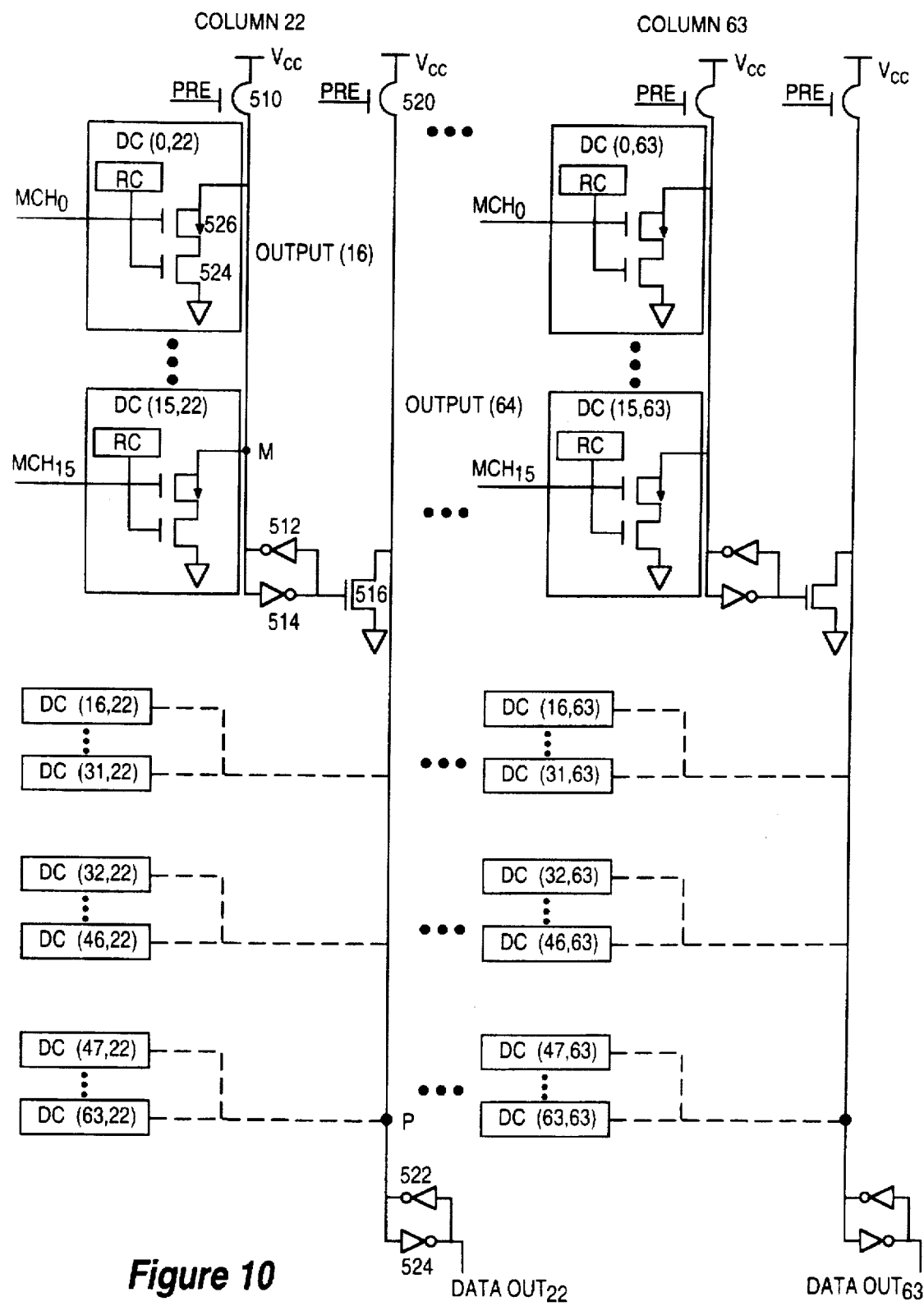
FIG. 10 illustrates the domino logic structure of the present invention in a first portion of the data array.
Figure 11:
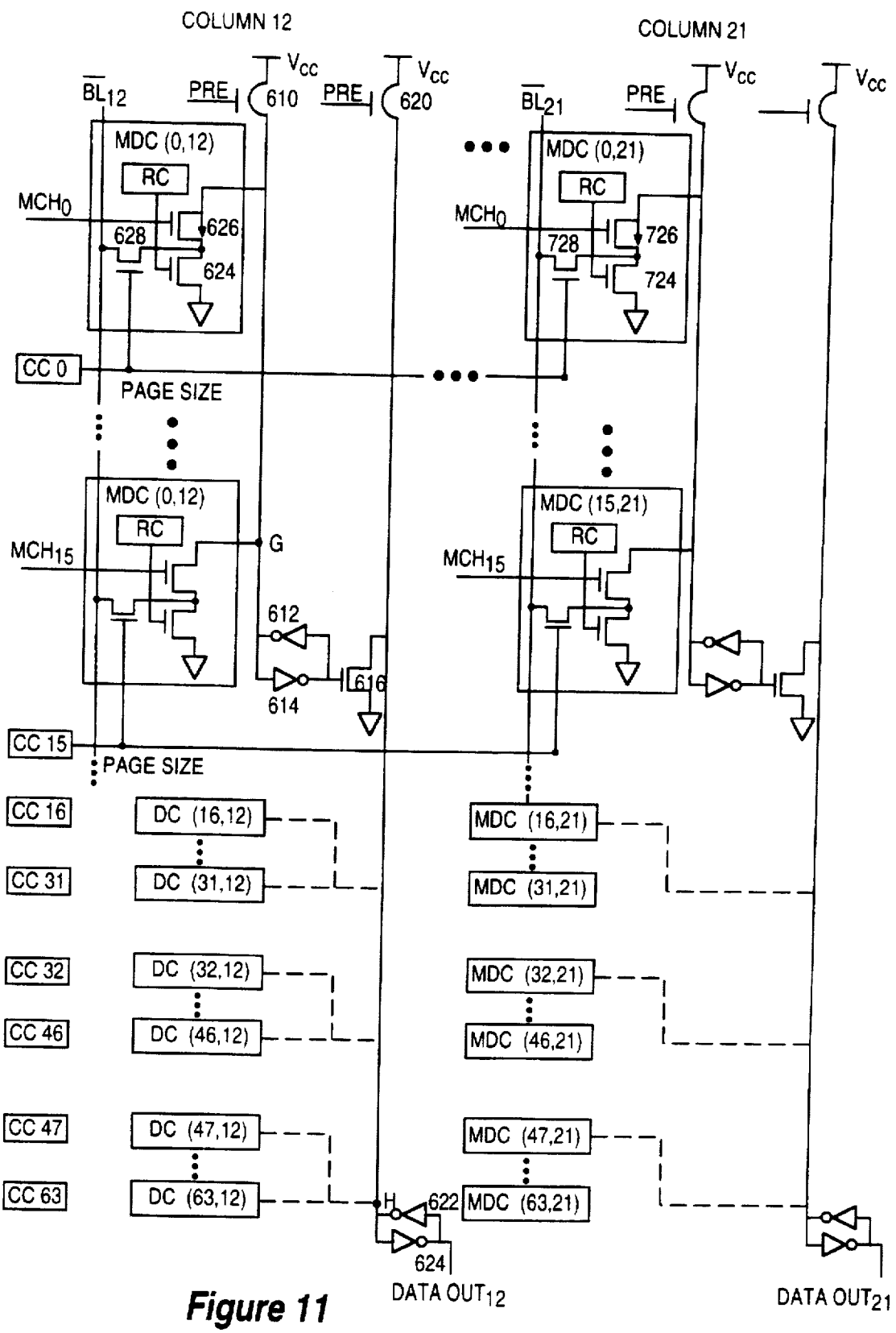
FIG. 11 illustrates the domino logic structure of the present invention in a second portion of the data array, this second portion incorporating both control cells and multiplexing data cells.

Referring now to FIGS. 10 and 11, these figures illustrate the domino logic structure of the data array of the present invention. In the description which follows, it will be appreciated that this domino logic structure does not utilize CMOS logic comprised of a $P_{net}$ of transistors and an $N_{net}$ of transistors. Instead, the domino logic structure utilizes an $N_{net}$ of transistors in conjunction with pre-charged devices and sustainer circuits of back-to-back inverters. The domino logic structure advantageously results in particularly fast read speeds, low loading, and a reduced use of chip space.

Referring in particular to FIG. 10, this figure illustrates the domino logic structure of a first non-multiplexing portion of the data array. Returning to FIG. 6 briefly, it will be appreciated that this first portion of the data array corresponds to the portion denoted "A". With reference now to FIG. 10, the position of each data cell (DC) in this figure is designated with its row and column position within the data array. Each of the columns in this first portion is similar in construction to the first column shown, column 22, and the last column shown, column 63. As shown, each column in the data array has an output. Thus, the output for column 22 is taken at data $out_{22}$, while the output for column 63 is taken at data $out_{63}$.

Referring for illustrative purposes to column 22, it can be observed that the 64 data cells in the column are divided into four groups of 16 data cells each. These four groups are: DC (0,22)–DC (15,22); DC (16,22)–DC (31,22); DC (32,22)–DC (46,22); DC (47,22)–DC (63,22). Each one of the four groups is similar in construction to the first group DC (0,22)–DC (15,22) which will now be described in detail. Each one of the data cells is comprised of the circuitry shown in FIG. 9. Thus, transistor 526 in FIG. 10 would correspond to transistor 426 in FIG. 9. Similarly, transistor 524 in FIG. 10 would correspond to transistor 424 in FIG. 9. The RAM cell (RC) in FIG. 10 would correspond to RAM cell 401 in FIG. 9. Each one of the data cells DC (0,22)–DC (15,22) provides an output to the output (16) line at node M. At node M, the output (16) line is coupled to a sustainer circuit comprising back-to-back inverters 512 and 514. This sustainer circuit is in turn coupled to the gate of transistor 516 which is also coupled to ground.

In order to read the contents of a data cell such as DC (0,22), both device 510 and device 520 are pre-charged. The state of node M is maintained by back-to-back inverters 512 and 514. The state of node P is also maintained by back-to-back inverters 522 and 524. Assuming, for example that the match line for row 0 ($MCH_0$) is enabled following a tag match of this line, this will cause transistor 526 to discharge. Depending upon the state of the bit in the RAM cell (RC), transistor 524 will either discharge or not discharge. For example, if the bit in the RAM cell is in a first state which causes transistor 524 to discharge, node M will change state. This change in state will, in turn, cause transistor 516 to discharge, causing the state of node P to change, which will, in turn, cause the state of Data $Out_{22}$ to change. Assuming, on the other, that the bit in the RAM cell (RC) is in a second state which does not cause transistor 526 to discharge, the above domino effect will not take place, and Data $Out_{22}$ will remain the same. Thus, it will be appreciated that the illustrated domino structure in FIG. 10 provides for a quick and advantageous ability to determine the contents of a data cell. It will further be appreciated that enabling the match line for row 0 (MCH$_0$) thus allows one to read the contents of the RAM cells in data cells DC (0,22)–DC (0,63) at Data Out$_{22}$–Data Out$_{63}$.

Referring to FIG. 11, this figure illustrates the domino logic structure of a second portion of the data array. This second portion of the data array incorporates the control cells (CC's) and multiplexing data cells (MDC's) of the present invention. With reference to FIG. 6, this second portion of the data array corresponds to portion "B." Returning to FIG. 11, the position of each multiplexing data cell (MDC) in this figure is designated with its row and column position within the data array. Each of the columns in this first portion is similar in construction to the first column shown, column 12, as well as the last column shown, column 21. As shown, each column in the data array has an output. Thus, the output for column 12 is taken at data out$_{12}$, while the output for column 21 is taken at data out$_{21}$.

Referring to exemplary column 12, this 64 data cells in the column are also divided into four groups of 16 data cells each. These four groups are: MDC (0,12)–MDC (15,12); MDC (16,12)–MDC (31,12); MDC (32,12)–MDC (46,12); MDC (47,12)–MDC (63,12). Each one of the four groups is similar in construction to the first group MDC (0,12)–MDC (15,12) illustrated in detail. Referring for illustrative purposes to the first group, each one of the multiplexing data cells is comprised of the circuitry shown in FIG. 7. Thus, transistor 626 in FIG. 11 correspond to transistor 226 in FIG. 7, while transistors 624 and 628 in FIG. 11 correspond to transistors 224 and 228, respectively, in FIG. 7. Similarly, the RAM cell (RC) in FIG. 11 correspond to RAM cell 201 in FIG. 7. Each one of the multiplexing data cells MDC (0,12)–DC (15,12) provides an output to the output (16) line at node G. At node G, the output (16) line is coupled to a sustainer circuit comprising back-to-back inverters 612 and 614. This sustainer circuit is in turn coupled to the gate of transistor 616 coupled to ground. The state of node H is maintained by back-to-back inverters 622 and 624.

Referring now to FIGS. 8, and 11, the operation of this second portion of the data array will now be explained with respect to data line 0. Assuming the TLB is to store a small page address in data line 0. As this small page is stored in data line 0, a first signal is stored in control cell 0 (CC0) shown in FIG. 11. With respect to FIG. 8, this first signal would correspond to a high signal written into node Z. As a result, the output from the control cell over the page size line would be the inversion of this, or a low signal. Returning to FIG. 11, this low signal would be coupled to the gates of transistors 628 and 728, as well as the gates of the transistors similarly situated in multiplexing data cells MDC (0,13) –MDC (0,20) (not shown). Assuming a tag match of tag line 0 has occurred, match line 0 (MC$_0$) is driven high and this high signal is coupled to the gates of transistors 626 and 726, as well as the gates of the transistors similarly situated in multiplexing data cells MDC (0,13)–MDC (0,20).

In accordance with the present invention, whenever a match of a tag line has occurred, predesignated bits from the input address, in particular, input address bits $\overline{IA_{12}}$–$\overline{IA_{21}}$ are driven over $\overline{BL_{12}}$–$\overline{BL_{21}}$. Because control cell 0 (CC$_0$) is driving the gates of transistors 628 and 728, low, the driving of this data over $\overline{BL_{12}}$–$\overline{BL_{21}}$ is effectively ignored, and has no effect on nodes G and H. Instead, the outputs at data out$_{12}$–data out$_{21}$ are determined by the contents of the RAM cells (RC's) in MDC (0,12) –MDC (0,21). In this way, when a small page is stored in the data line, the multiplexing data cells operating in conjunction with the control cell for the data line, cause the contents of the multiplexing data cells to make up these bits in the physical address output.

Alternatively, assuming the TLB is to store a large page address in data line 0, then as this large page is stored in data line 0, a second signal is stored in control cell 0 shown in FIG. 11. Referring to FIG. 8, this second signal would correspond to a low signal written into node Z. As a result, the output from the control cell over the page size line would be the inversion of this, or a high signal. Returning to FIG. 11, this high signal would be coupled to the gates of transistors 628 and 728, as well as the gates of the transistors similarly situated in multiplexing data cells MDC (0,13) –MDC (0,20).

In accordance with an operating convention of the present invention, whenever a large page is written into a data line, low signals are also written into the Ram Cells in the multiplexing data cells of that data line. Thus, referring for example, to data line 0 in FIG. 11, if this data line were to store a large page address, then low signals would be written into the Ram Cells in MDC (0,12) –MDC (0,21) at the same time the other large page bits are written into the data line. Thus, transistors 624 and 724, as well as those transistors similarly situated in MDC (0,13) MDC (0,20) would be turned off.

Continuing to refer to FIG. 11, assuming a tag match of tag line 0 occurs, match line 0 (MC$_0$) is driven high, and this high signal is coupled to transistors 626 and 726. As described above, whenever a match of a tag line has occurred, input address bits $\overline{IA_{12}}$–$\overline{IA_{21}}$ are driven over $\overline{BL_{12}}$–$\overline{BL_{21}}$. Because transistors 628 and 728, and similarly situated transistors in MDC (0,13)–MDC (0,20) have been turned off, it is now this data driven over $\overline{BL_{12}}$–$\overline{BL_{21}}$ which determines the outputs at data out$_{12}$–data out$_{21}$. In this way, when a large page is stored in the data line, the multiplexing data cells operating in conjunction with the control cell for the data line, cause the input address bits to determine these bits in the physical address output.

While the present invention has been particularly described with reference to FIGS. 1 through 11, and with emphasis on certain circuit components, it should be understood that the figures are for illustration only and should not be taken as limitations upon the invention. It is additionally clear that the method and apparatus of the present invention may have utility in a wide variety of caching applications. References to certain circuits, and the absence of specific, exhaustive references to each and every circuit in which the present invention can be advantageously utilized should not be taken as an expression of any limitation upon the understood, widespread applicability of the present invention. It is further contemplated that many changes and modifications may be made, by one of ordinary skill in the art, without departing from the spirit and scope of the invention as disclosed herein.

I claim:

1. A translation lookaside buffer managing information for a plurality of different page sizes, comprising:

a tag array, having at least one tag line and comparing said at least one tag line to an input address to determine if said at least one tag line matches said input address, said tag array including a first control cell generating a first signal and coupling said first signal to each of a first plurality of cells in said at least one tag line, said first signal selectively disabling a comparison of a first plurality of bits stored in the first plurality of cells to a second plurality of bits in said input address; and a data array, coupled to said tag array, said data array having a data line corresponding to said at least one tag line, said data array selectively outputting an output address corresponding to one of said plurality of different page sizes if said at least one tag line matches said input address, said data array further including a second control cell outputting a second signal and coupling said second signal to each of a third plurality of cells in said data line, said third plurality of cells outputting predesignated bits in said output address, said second signal selectively determining whether cells output bits stored in said third plurality of cells or output a fourth plurality of bits in said input address as said predesignated bits in said output address;

wherein without reading said first control cell or said second control cell said data array uses said second control cell to selectively determine whether said third plurality of cells output bits stored in the third plurality of cells or output said fourth plurality of bits in said input address as said predesignated bits in said output address;

wherein said third plurality of cells comprise multiplexing data cells operating in conjunction with said second control cell to selectively determine whether said multiplexing data cells output bits stored in the multiplexing data cells or output said fourth plurality of bits in said input address as said predesignated bits in said output address.

2. The translation lookaside buffer as provided in claim 1, wherein without reading said first control cell or said second control cell said multiplexing data cells operate in conjunction with said second control cell to selectively determine whether said multiplexing data cells output bits stored in the multiplexing data cells or output said fourth plurality of bits in said input address as said predesignated bits in said output address.

3. The translation lookaside buffer as provided in claim 1, wherein said translation lookaside buffer is mapped in accordance with a fully associative mapping policy.

4. The translation lookaside buffer as provided in claim 1, wherein said data array comprises domino logic circuitry including an Nnet of transistors, precharged devices and sustainer circuits of back-to-back inverters.

5. The translation lookaside buffer of claim 1, wherein:
said at least one tag line includes said first control cell; and
said data line includes said second control cell.

6. The translation lookaside buffer of claim 1, wherein:
said tag array comprises a plurality of tag lines each including said first control cell; and
said data array comprises a plurality of data lines each including said second control cell.

7. The translation lookaside buffer of claim 1, wherein:
said at least one tag line includes said first control cell; and
said data line includes said second control cell coupled to said multiplexing data cells.

8. The translation lookaside buffer of claim 1, wherein:
said tag array comprises a plurality of tag lines each including said first control cell; and
said data array comprises a plurality of data lines each including said second control cell coupled to said multiplexing data cells.

9. A translation lookaside buffer managing information for a plurality of different page sizes, comprising:

a tag array means for storing at least one tag line and comparing said at least one tag line to an input address to determine if said at least one tag line matches said input address, said tag array including a first control cell means for generating a first signal and coupling said first signal to each of a first plurality of cells in said at least one tag line, said first signal selectively disabling the first plurality of cells from comparing a first plurality of bits stored in the first plurality of cells to a second plurality of bits in said input address;

data array means for storing a data line corresponding to said at least one tag line and outputting an output address if said at least one tag line matches said input address, said data array means including second control cell means for outputting a second signal and coupling said second signal to each of a third plurality of cells in said data line, said third plurality of cells outputting predesignated bits in said putout address, said second signal selectively determining whether said third plurality of cells output bits stored in said third plurality of cells or output a fourth plurality of bits in said input address as said predesignated bits in said output address;

wherein without reading said first control cell means or said second control cell means said data array means uses said second control cell means to selectively determine whether said third plurality of cells output bits stored in the third plurality of cells or output said fourth plurality of bits in said input address as said predesignated bits in said output address;

wherein said third plurality of cells comprise multiplexing data cells operating in conjunction with said second control cell means to selectively determine whether said multiplexing data cells output bits stored in the multiplexing data cells or output said fourth plurality of bits in said input address as said predesignated bits in said output address.

10. The translation lookaside buffer as provided in claim 9, wherein without reading said first control means or said second control cell means said multiplexing data cells operate in conjunction with said second control cell means to selectively determine whether said multiplexing data cells output bits stored in the multiplexing data cells or output said fourth plurality of bits in said input address as said predesignated bits in said output address.

11. The translation lookaside buffer as provided in claim 9, wherein said translation lookaside buffer means is mapped in accordance with a fully associative mapping policy.

12. The translation lookaside buffer as provided in claim 9, wherein said data array means comprises domino logic circuitry including an Nnet of transistors, precharged devices and sustainer circuits of back-to-back inverters.

13. The translation lookaside buffer of claim 9, wherein:
said at least one tag line includes said first control cell means; and
said data line includes said second control cell means.

14. The translation lookaside buffer of claim 9, wherein:
said tag array means comprises a plurality of tag lines each including said first control cell means; and
said data array means comprises a plurality of data lines each including said second control cell means.

15. The translation lookaside buffer of claim 9, wherein:
said at least one tag line includes said first control cell means; and
said data line includes said second control cell means coupled to said multiplexing data cells.

16. The translation lookaside buffer of claim 9, wherein:
said tag array means comprises a plurality of tag lines each including said first control cell means; and
said data array means comprises a plurality of data lines each including said second control cell means coupled to said multiplexing data cells.

17. A processor system comprising:
a processor core; and
a translation lookaside buffer coupled to said processor core to accept an input address from said processor core, said translation lookaside buffer managing information for a plurality of different page sizes, said translation lookaside buffer including:
  a tag array, having at least one tag line and comparing said at least one tag line to an input address to determine if said at least one tag line matches said input address, said tag array including a first control cell generating a first signal and coupling said first signal to each of a first plurality of cells in said at least one tag line said first signal selectively disabling a comparison of a first plurality of bits stored in the first plurality of cells to a second plurality of bits in said input address; and
  a data array, coupled to said tag array, said data array having a data line corresponding to said at least one tag line, said data array selectively outputting an output address corresponding to one of said plurality of different page sizes if said at least one tag line matches said input address, said data array further including a second control cell outputting a second signal and coupling said second signal to each of a third plurality of cells in said data line, said third plurality of cells outputting predesignated bits in said output address, said second signal selectively determining whether said third plurality of cells output bits stored in said third plurality of cells or output a fourth plurality of bits in said input address as said predesignated bits in said output address;
  wherein without reading said first control cell or said second control cell said data array uses said second control cell to selectively determine whether said third plurality of cells output bits stored in the third plurality of cells or output said fourth plurality of bits in said input address as said predesignated bits in said output address;
  wherein said third plurality of cells comprise multiplexing data cells operating in conjunction with said second control cell to selectively determine whether said multiplexing data cells output bits stored in the multiplexing data cells or output said fourth plurality of bits in said input address as said predesignated bits in said output address.

18. The processor system as provided in claim 17, wherein without reading said first control cell or said second control cell said multiplexing data cells operate in conjunction with said second control cell to selectively determine whether said multiplexing data cells output bits stored in the multiplexing data cells or output said fourth plurality of bits in said input address as said predesignated bits in said output address.

19. The processor system as provided in claim 17, wherein said translation lookaside buffer is mapped in accordance with a fully associative mapping policy.

20. The processor system as provided in claim 17, wherein said data array comprises domino logic circuitry including an Nnet of transistors, precharged devices and sustainer circuits of back-to-back inverters.

21. The processor system as provided in claim 17, further comprising a cache coupled to said translation lookaside buffer and said processor core, said output address used to access information stored in said cache when said information is required by said processor core.

22. The processor system as provided in claim 17, further comprising main memory, coupled to said cache, said main memory providing said information to said cache if said information is required by said processor core and said information is not available in said cache.

23. The translation lookaside buffer of claim 17, wherein:
said at least one tag line includes said first control cell; and
said data line includes said second control cell.

24. The translation lookaside buffer of claim 17, wherein:
said tag array comprises a plurality of tag lines each including said first control cell; and
said data array comprises a plurality of data lines each including said second control cell.

25. The translation lookaside buffer of claim 17, wherein:
said at least one tag line includes said first control cell; and
said data line includes said second control cell coupled to said multiplexing data cells.

26. The translation lookaside buffer of claim 17, wherein:
said tag array comprises a plurality of tag lines each including said first control cell; and
said data array comprises a plurality of data lines each including said second control cell coupled to said multiplexing data cells.

27. A method for managing information for a plurality of different page sizes within a translation lookaside buffer, comprising the steps of:
  generating a first signal from a first control cell in at least one tag line in a tag array of the translation lookaside buffer;
  coupling the first signal to a first plurality of cells in the at least one tag line;
  in response to the first signal, selectively comparing a first plurality of bits stored in the first plurality of cells to a second plurality of bits of an input address to determine if said at least one tag line matches said input address;
  outputting a second signal from a second control cell in a data line of a data array of the translation lookaside buffer wherein the data line corresponds to the at least one tag line of the tag array;
  coupling the second signal to a third plurality of cells of the data line;
  in response to the second signal, the third plurality of cells outputting a third plurality of bits stored in the third plurality of cells or a fourth plurality of bits from said input address; and
  outputting said output address corresponding to said one of said plurality of different page sizes from said data array if said at least one tag line matches said input address;
  wherein in response to said second signal and without reading said first control cell or said second control cell said third plurality of cells output bits stored in the third plurality of cells or output a fourth plurality of bits in said input address as said predesignated bits in said output address;
  wherein said third plurality of cells comprise multiplexing data cells operating in conjunction with said second control cell to selectively determine whether said multiplexing data cells output bits stored in the multiplexing data cells or output the fourth plurality of bits in said input address as said predesignated bits in said output address.

28. The method as provided in claim 27, wherein said multiplexing data cells operate in conjunction with said second control cell, and without reading said first control cell or said second control cell, selectively determine whether said multiplexing data cells output bits stored in the multiplexing data cells or output the fourth plurality of bits in said input address as said predesignated bits in said output address.

29. The method as provided in claim 27 wherein a fully associative mapping policy is employed.

30. The method as provided in claim 27 wherein said data array comprises domino logic circuitry including an Nnet of transistors, precharged devices and sustainer circuits of back-to-back inverters.

31. A translation lookaside buffer managing information for a plurality of different page sizes, comprising:

a tag array having a plurality of tag lines each configured to receive a plurality of input address bits, each tag line comprising:

a first plurality of cells storing bits corresponding to a first page address;

a second plurality of cells storing bits corresponding an address within the first page address;

a third plurality of cells storing bits corresponding to either part of the first page address or part of the address within the first page; and a first control cell coupled to the third plurality of cells, the first control cell storing a bit indicating whether the third plurality of cells store part of the first page address or part of the address within the first page, the first control cell generating a first signal, wherein the first signal is coupled to the third plurality of cells and controls whether each of the third plurality of cells compare their bits to corresponding bits of the input address bits; and a data array coupled to the tag array and including a plurality of data lines each corresponding to a tag line in the tag array, wherein each data line comprises:

a fourth plurality of cells storing bits corresponding to a second page address;

a plurality of multiplexing data cells each configured to receive at least one of the plurality of input address bits, the multiplexing data cells storing bits corresponding to part of the second page address or outputting the at least one of the plurality of input address bits; and a second control cell coupled to the multiplexing data cells, the second control cell storing a bit and generating a second signal coupled to the multiplexing data cells, the second signal controlling whether the multiplexing data cells output part of the second page address or output the at least one of the plurality of input address bits corresponding to an address within the second page;

wherein each of the third plurality of control cells comprises a content addressable memory cell (CAM) storing the bit corresponding to either part of the first page address or part of the address within the first page; and a logic circuit coupled to the CAM cell and enabled by the first signal to compare the bit stored in the CAM cell with a corresponding bit of the input address when the third plurality of bits store part of the first page address, and disabled by the first signal from comparing the bit stored in the CAM cell with a corresponding bit of the input address when the third plurality of bits store the address within the first page.

32. The translation lookaside buffer of claim 31, wherein without reading the first control cell or the second control cell each second control cell generates the second signal controlling whether the multiplexing data cell output part of the second page address or output the at least one of the plurality of input address bits corresponding to an address within the second page.

33. The translation lookaside buffer of claim 31, wherein each of the multiplexing data cells comprise:

a first circuit storing the bit corresponding to part of the second page address; and a second circuit coupled to the first circuit and the at least one of the plurality of input address bits, the second circuit configured to receive the second signal from the second control cell, wherein the second circuit outputs the bit stored in the first circuit or the at least one of the plurality of input address bits in response to the second signal.

\* \* \* \* \*